United States Patent
Jung et al.

(10) Patent No.: US 10,548,058 B2
(45) Date of Patent: Jan. 28, 2020

(54) CELL SELECTION/RE-SELECTION METHOD FOR INTER-FREQUENCY SIDELINK OPERATION EXECUTED BY TERMINAL IN WIRELESS COMMUNICATION SYSTEM, AND TERMINAL USING SAID METHOD

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/773,546

(22) PCT Filed: Nov. 4, 2016

(86) PCT No.: PCT/KR2016/012667
§ 371 (c)(1),
(2) Date: May 3, 2018

(87) PCT Pub. No.: WO2017/078466
PCT Pub. Date: May 11, 2017

(65) Prior Publication Data
US 2018/0324660 A1 Nov. 8, 2018

Related U.S. Application Data

(60) Provisional application No. 62/250,527, filed on Nov. 4, 2015, provisional application No. 62/257,029, filed on Nov. 18, 2015.

(51) Int. Cl.
*H04W 36/04* (2009.01)
*H04W 48/16* (2009.01)
*H04W 76/27* (2018.01)

(52) U.S. Cl.
CPC .......... *H04W 36/04* (2013.01); *H04W 48/16* (2013.01); *H04W 76/27* (2018.02)

(58) Field of Classification Search
CPC . H04W 36/0083; H04W 36/14; H04W 48/18; H04W 8/005; H04W 76/27; H04W 48/16
See application file for complete search history.

(56) References Cited

U.S. PATENT DOCUMENTS

2014/0023032 A1  1/2014  Kim
2015/0215849 A1*  7/2015  Patel .................... H04W 48/16
                                        455/435.2

(Continued)

FOREIGN PATENT DOCUMENTS

KR  20120022976  3/2012
KR  20140053321  5/2014
KR  20150010434  1/2015

OTHER PUBLICATIONS

LTE-Advanced (3GPP Rel. 12) Technology Introduction White Paper (Year: 2014).*

(Continued)

*Primary Examiner* — Nizar N Sivji
(74) *Attorney, Agent, or Firm* — Lee Hong Degerman Kang & Waimey

(57) ABSTRACT

Provided are a cell selection/re-selection method for an inter-frequency sidelink operation executed by a terminal in a wireless communication system, and a terminal using the method. The method is characterized by determining whether cell selection/re-selection parameters which can be applied to a non-serving frequency to execute a sidelink operation have been configured and received; and when the cell selection/re-selection parameters have been configured and received, performing an evaluation for the cell selection/reselection or ranking of a cell in the non-serving frequency by using the cell selection/re-selection parameters.

11 Claims, 18 Drawing Sheets

(56) References Cited

U.S. PATENT DOCUMENTS

| | | | | |
|---|---|---|---|---|
| 2016/0249307 | A1* | 8/2016 | Thangarasa | H04W 56/001 |
| 2016/0323868 | A1* | 11/2016 | Kalhan | H04W 72/1278 |
| 2016/0330676 | A1* | 11/2016 | Thangarasa | H04W 76/14 |
| 2017/0034751 | A1* | 2/2017 | Fujishiro | H04W 36/0083 |
| 2017/0041773 | A1* | 2/2017 | Fujishiro | H04W 8/005 |
| 2017/0245247 | A1* | 8/2017 | Suzuki | H04W 72/04 |
| 2018/0035279 | A1* | 2/2018 | Fujishiro | H04W 8/00 |
| 2018/0077746 | A1* | 3/2018 | Lee | H04L 1/18 |
| 2018/0324621 | A1* | 11/2018 | Thangarasa | H04W 24/10 |
| 2018/0343627 | A1* | 11/2018 | Thangarasa | H04W 24/10 |

OTHER PUBLICATIONS

An Overview of D2D in 3GPP LTE standard Sofia Martinez Lopez (Year: 2016).*

PCT International Application No. PCT/KR2016/012667, Written Opinion of the International Searching Authority dated Jan. 23, 2017, 64 pages.

ZTE, "Sidelink direct discovery transmission in inter-carrier and inter-PLMN," 3GPP TSG-RAN WG3 #89bis, R3-151899, Oct. 2015, 5 pages.

3rd Generation Partnership Project (3GPP), "Technical Specification Group Radio Access Network; Evolved Universal Terrestrial Radio Access (E-UTRA); User Equipment (UE) procedures in idle mode (Release 8)," 3GPP TS 36.304 V8.5.0, Mar. 2009, 30 pages.

* cited by examiner

CELL SELECTION/RE-SELECTION METHOD FOR INTER-FREQUENCY SIDELINK OPERATION EXECUTED BY TERMINAL IN WIRELESS COMMUNICATION SYSTEM, AND TERMINAL USING SAID METHOD

CROSS-REFERENCE TO RELATED APPLICATIONS

This application is the National Stage filing under 35 U.S.C. 371 of International Application No. PCT/KR2016/012667, filed on Nov. 4, 2016, which claims the benefit of U.S. Provisional Application No. 62/250,527, filed on Nov. 4, 2015, and 62/257,029, filed on Nov. 18, 2015, the contents of which are all hereby incorporated by reference herein in their entirety.

BACKGROUND OF THE INVENTION

Field of the Invention

The present invention relates to wireless communication, and more particularly, to a cell selection/re-selection method for an inter-frequency sidelink operation performed by a user equipment in a wireless communication system and the user equipment using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

The D2D operation may have diverse advantages in the aspect of performing signal transmission/reception between close-ranged devices. For example, a D2D device (or D2D UE) may perform data communication at a high transmission rate with low latency. Also, the D2D operation may disperse (or distribute) the traffic being concentrated to the base station, and, if the D2D UE performs the functions of a relay station, the D2D UE may also perform the function of expanding the coverage of the base station A device-to-device (D2D) operation may also be referred to as a sidelink operation. Sidelink operations include sidelink discovery and sidelink communication. In the sidelink operation, uplink resources may be used.

Meanwhile, in a conventional wireless communication system (e.g., a wireless communication system operating based on the LTE-A Release 12), transmission of a sidelink discovery signal may be made only at a serving frequency. That is, transmitting a discovery signal at a frequency (non-serving frequency) other than the serving frequency is not considered. In case where the sidelink discovery signal is transmitted at the serving frequency, a reference cell regarding operations such as sidelink synchronization, sidelink power control, resource pool selection based on reference signal received power (RSRP), and the like, required for transmission of the sidelink discovery signal is a serving cell of the serving frequency. That is, in transmitting the sidelink discovery signal, operations such as sidelink synchronization, sidelink power control, RSRP-based resource pool selection, and the like, are performed on the basis of the serving cell.

Meanwhile, in a future wireless communication system (e.g., a wireless communication system operating based on the LTE-A Release 13), transmission of the sidelink discovery signal may also be performed at a frequency other than the serving frequency.

In this case, how to determine a reference cell for sidelink discovery signal transmission or operations required for the sidelink discovery signal transmission, and how to perform measurement and evaluation required for the sidelink discovery signal transmission are required to be defined.

SUMMARY OF THE INVENTION

The present invention provides a cell selection/re-selection method for an inter-frequency sidelink operation performed by a terminal in a wireless communication system and a terminal using the method.

In one aspect, provided is a cell selection/re-selection method for an inter-frequency sidelink operation performed by a user equipment (UE) in a wireless communication system. The cell selection/re-selection method includes determining whether a cell selection/reselection parameter applicable to a non-serving frequency to perform a sidelink operation has been configured and performing evaluation for cell selection/re-selection or ranking at the non-serving frequency using the cell selection/re-selection parameter when the cell selection/re-selection parameter has been configured.

The sidelink operation may be a sidelink discovery operation.

The UE may receive the cell selection/re-selection parameter applicable to the non-serving frequency from a serving cell of the UE.

When a specific parameter, among parameters used for performing the evaluation for the cell selection/re-selection or the ranking at the non-serving frequency, is not included in the cell selection/re-selection parameter, the UE may apply a zero value to the specific parameter.

When the cell selection/re-selection parameter applicable to the non-serving frequency is not configured from a serving cell, the UE may perform the evaluation for the cell selection/re-selection or the ranking at the non-serving frequency using a cell selection/re-selection parameter provided by a cell selected for the sidelink operation.

The cell selected for the sidelink operation may be a cell present at the non-serving frequency.

The cell selected for the sidelink operation may broadcast a cell selection/re-selection parameter.

The cell selection/re-selection parameter applicable to the non-serving frequency to perform the sidelink operation may be provided through a radio resource control (RRC) message.

In another aspect, provided is a user equipment (UE). The UE includes a radio frequency (RF) unit transmitting and receiving a wireless signal and a processor coupled to the RF unit to operate. The processor determines whether a cell selection/re-selection parameter applicable to a non-serving frequency to perform a sidelink operation has been configured, and performs evaluation for cell selection/re-selection or ranking at the non-serving frequency using the cell selection/re-selection parameter when the cell selection/reselection parameter has been configured.

According to the present invention, a terminal may perform an appropriate operation according to whether parameters required for measurement and evaluation for performing an inter-frequency discovery operation are provided by a serving cell. There is no ambiguity in the inter-frequency discovery operation, and an unnecessary operation such as receiving system information transmitted by a cell at a non-serving frequency although the serving cell provides the parameters required for the inter-frequency discovery operation is prevented.

DESCRIPTION OF EXEMPLARY EMBODIMENTS

Figure 1:
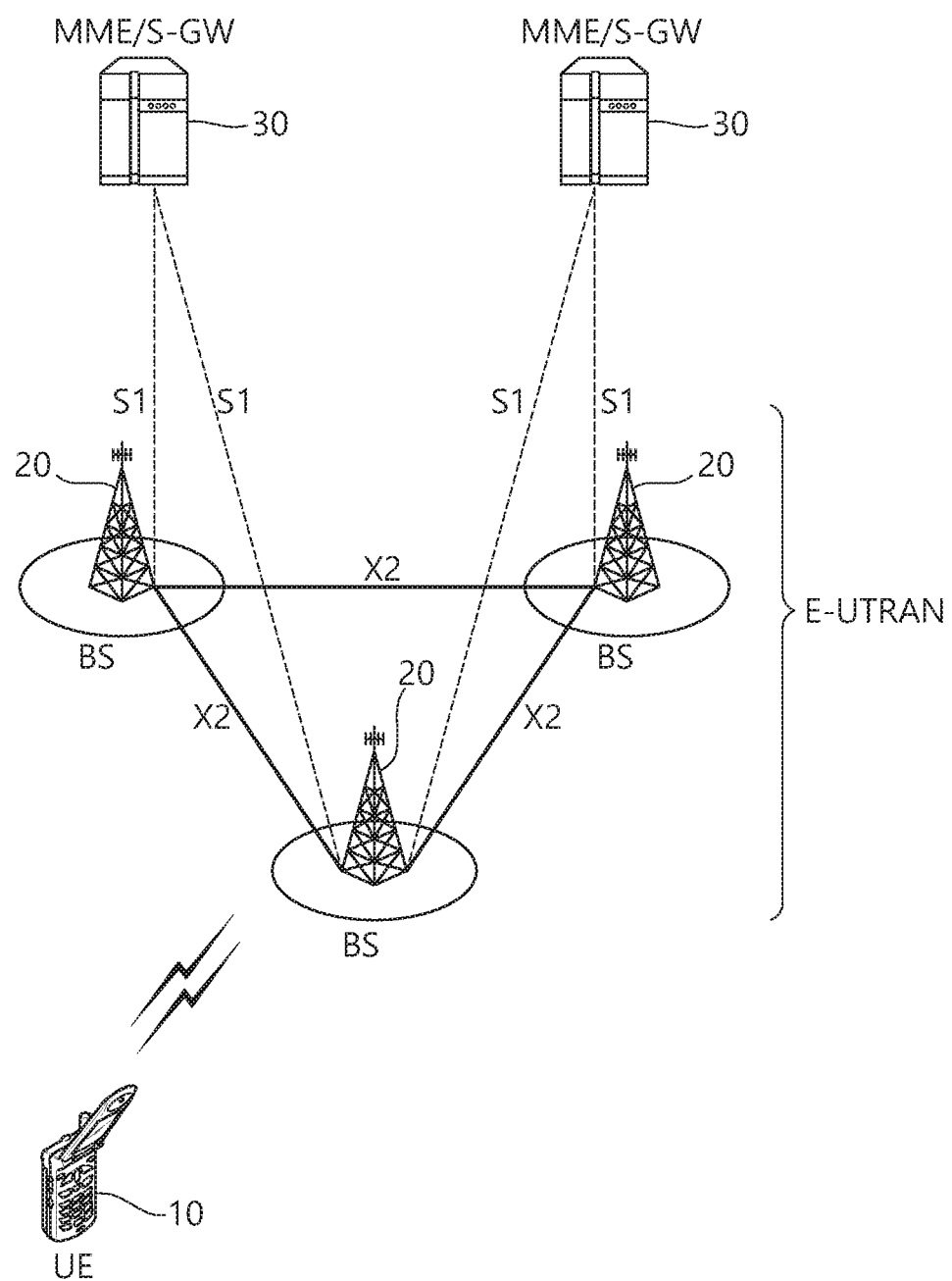
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
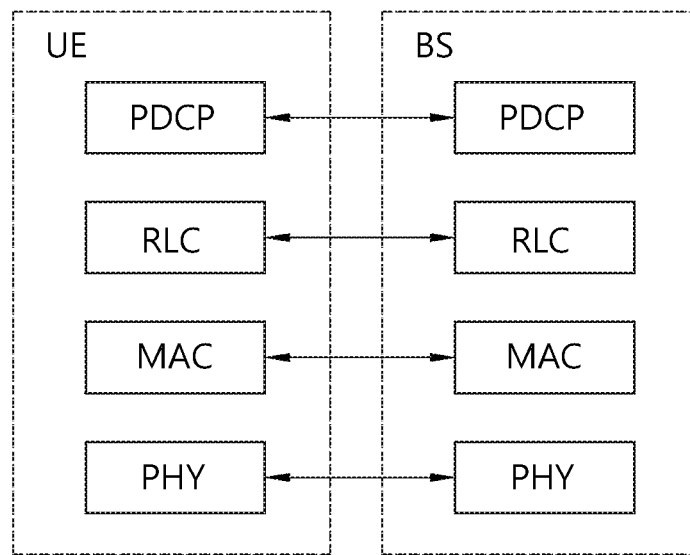
FIG. 2 is a diagram showing a wireless protocol architecture for a user plane.
Figure 3:
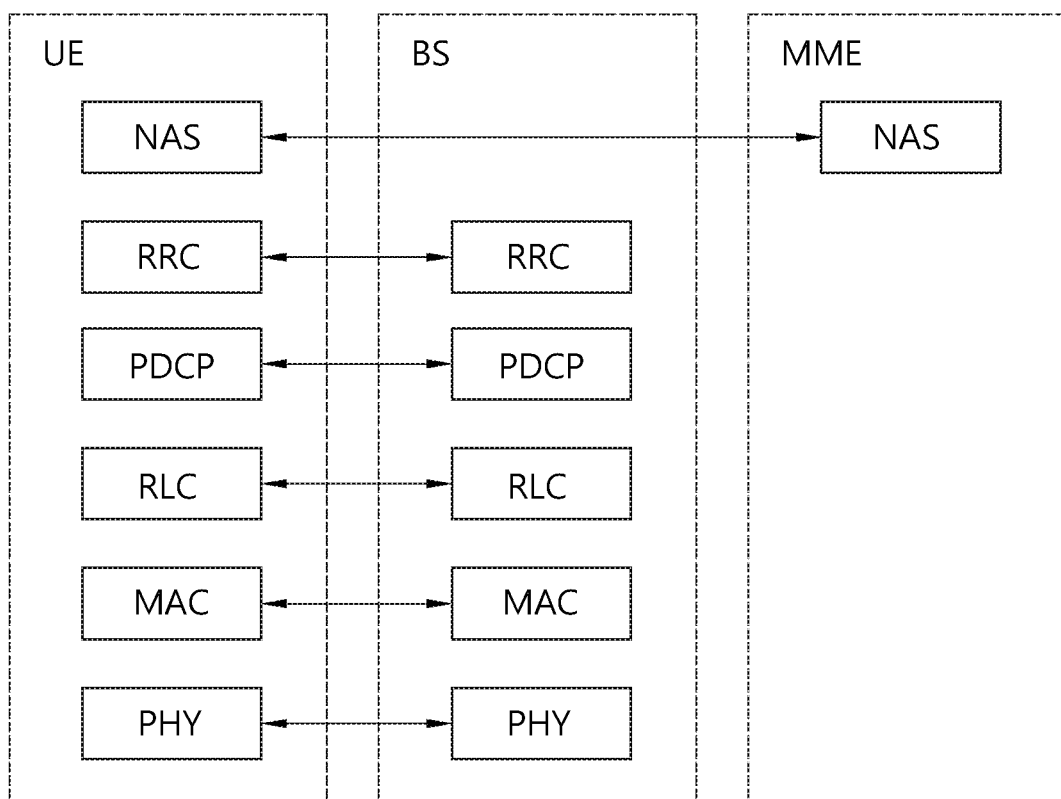
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
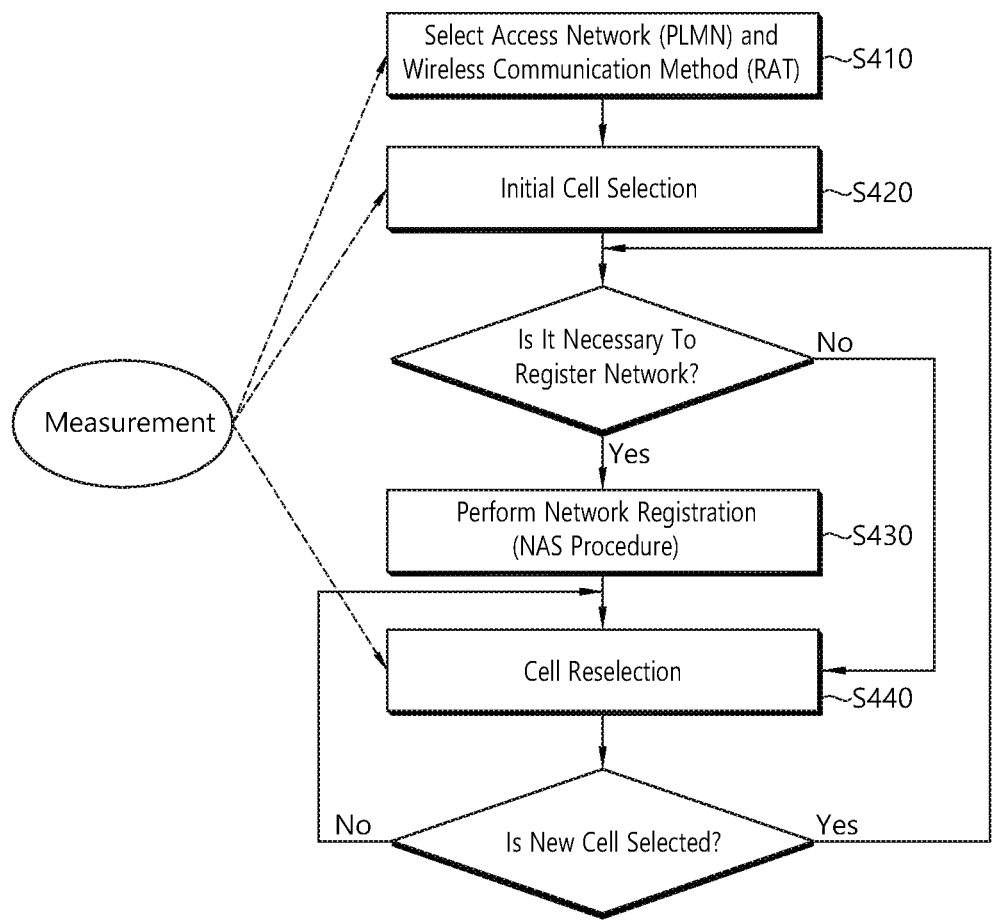
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
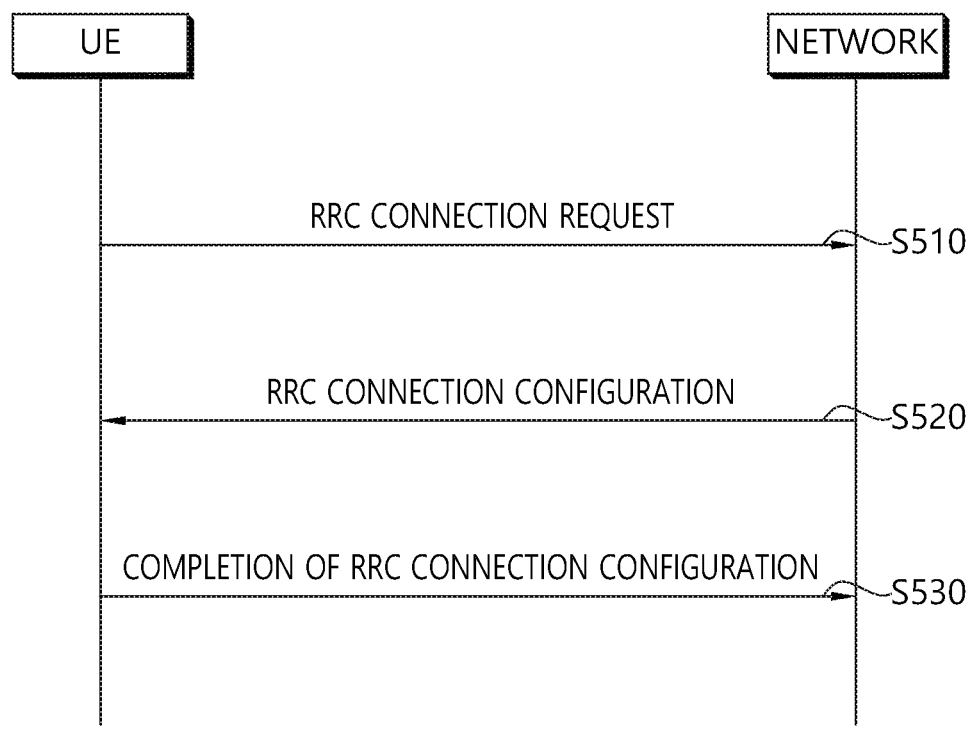
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
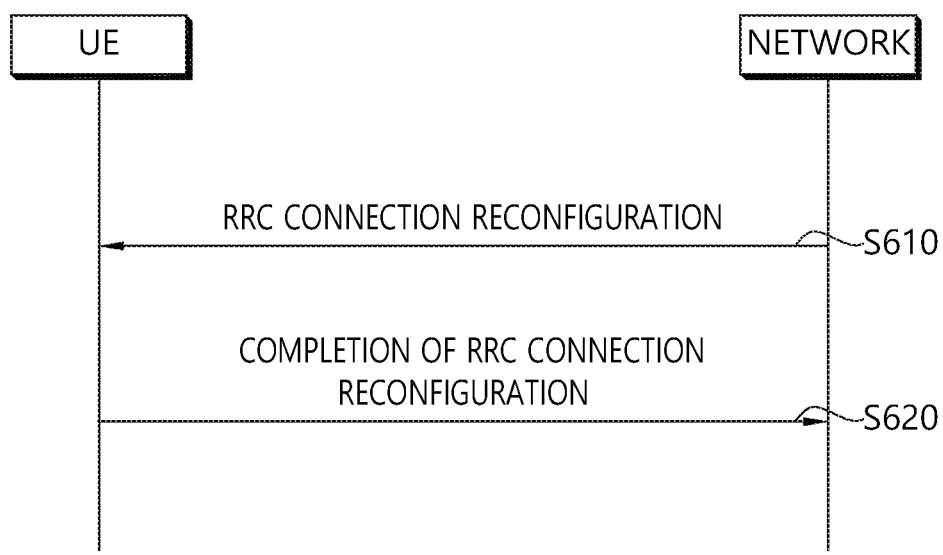
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

Srxlev>0 AND Squal>0 where:

Srxlev=$Q_{rxlevmeas}-(Q_{rxlvmin}+Q_{rxlevminoffset})-$Pcompensation

Squal=$Q_{qualmeas}-(Q_{qualmin}+Q_{qualminoffset})$ [Equation 1]

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Q_{meas,s} + Q_{hyst}, \quad Rn = Q_{meas,s} - Q_{offset} \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell res election.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
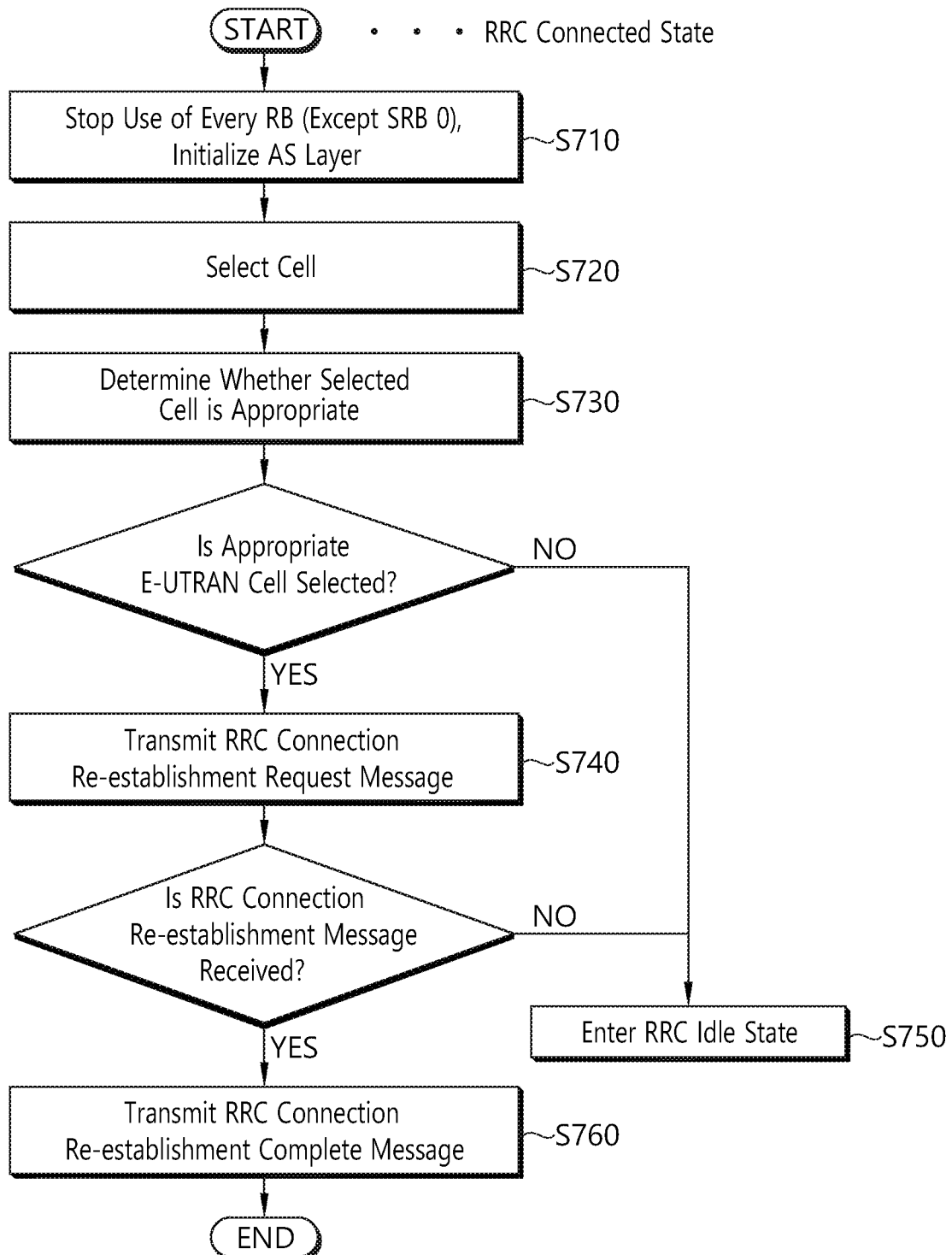
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
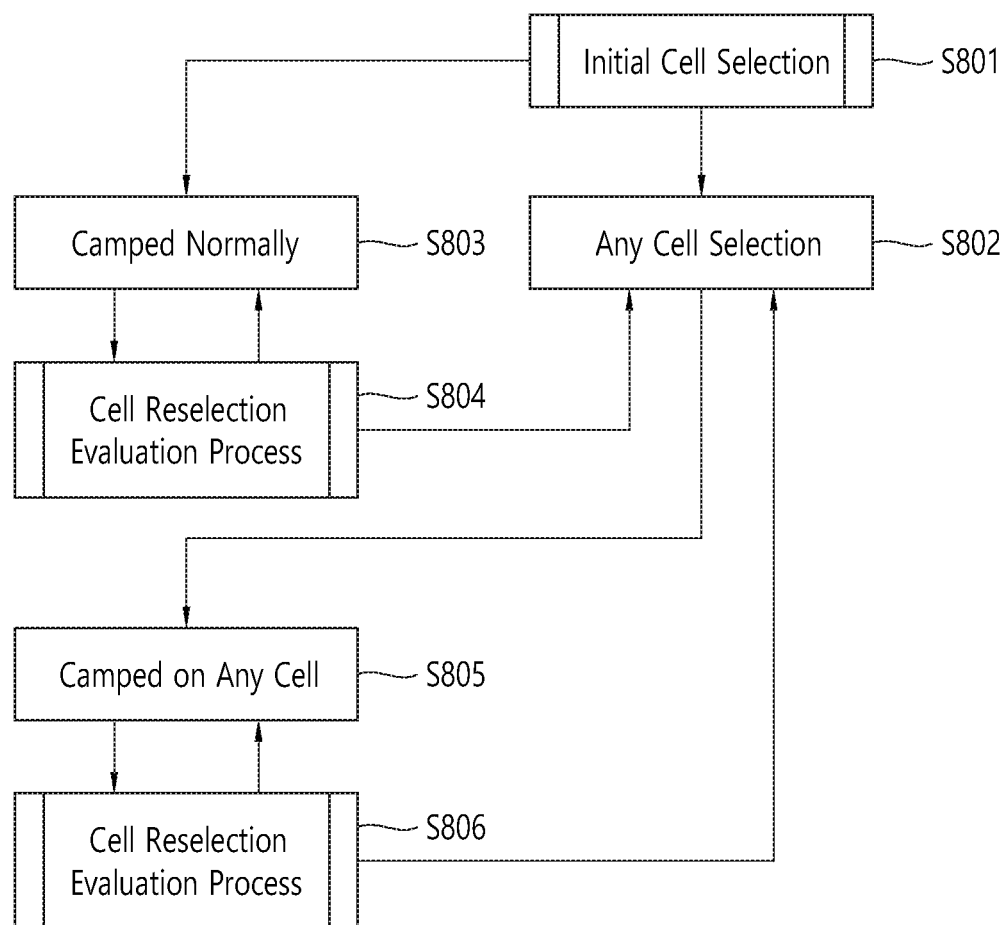
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
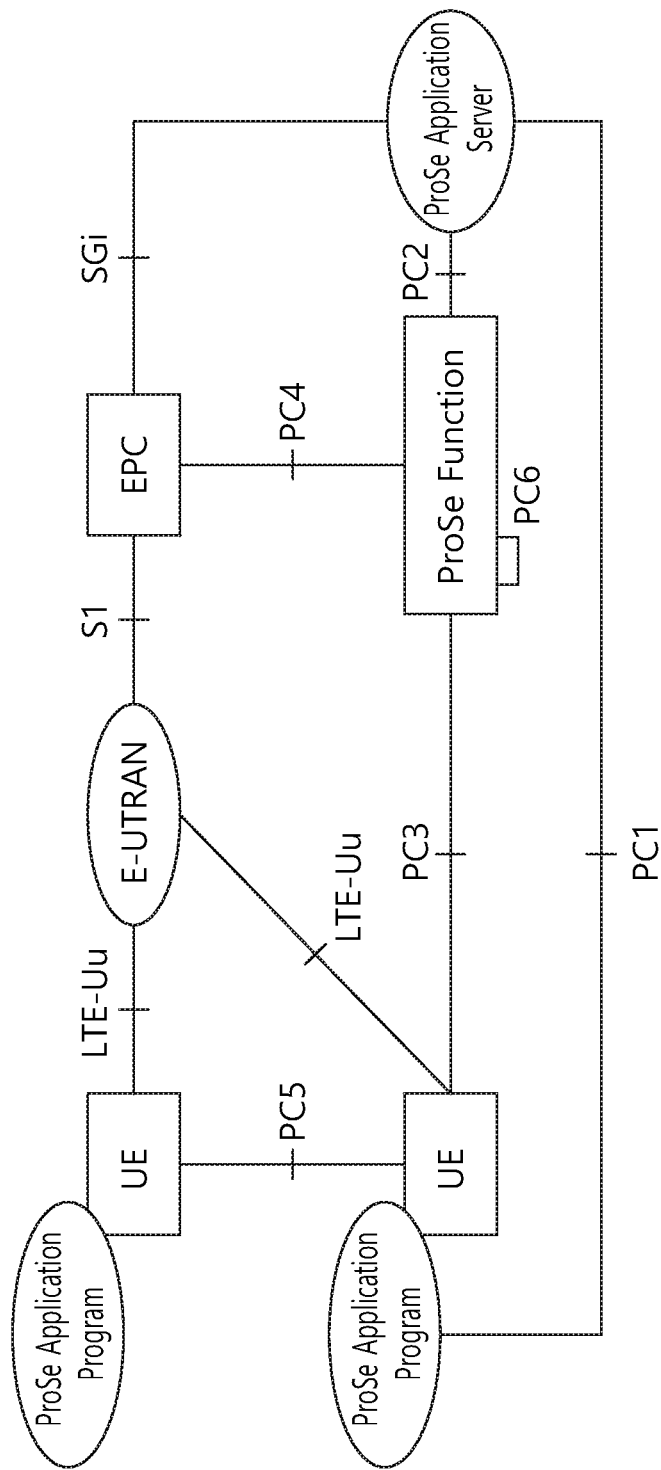
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication (D2D Communication)>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
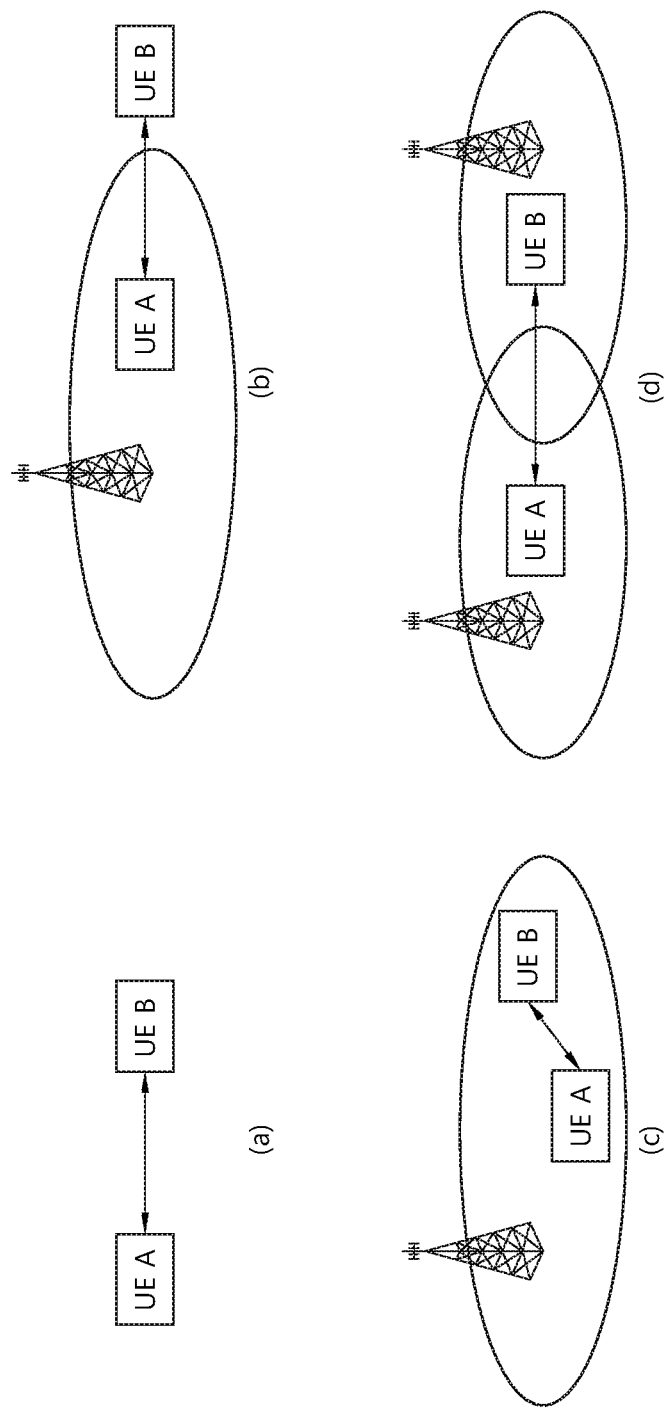
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
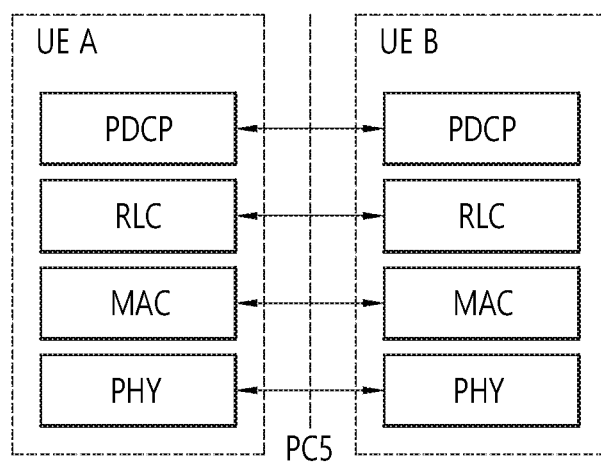
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
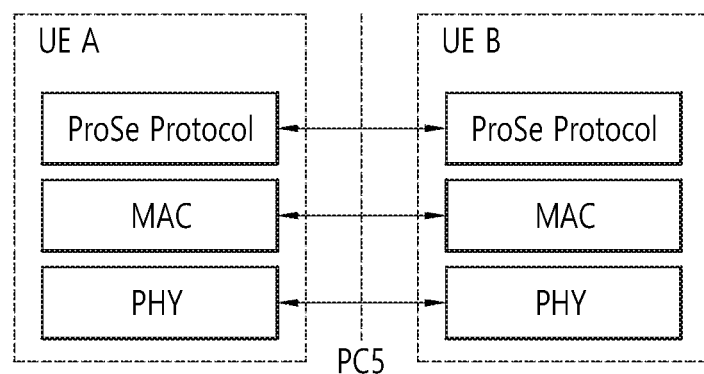
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
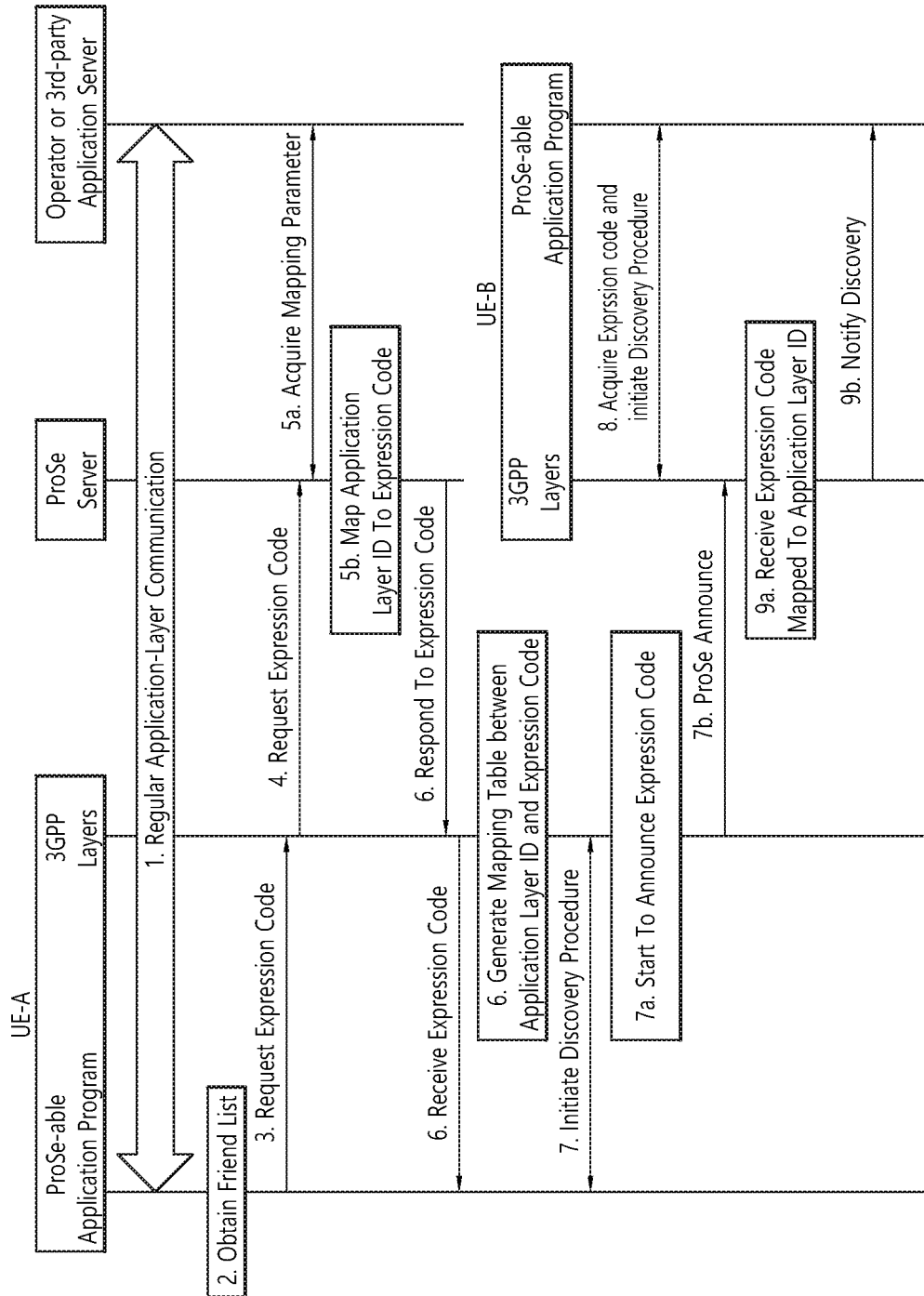
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
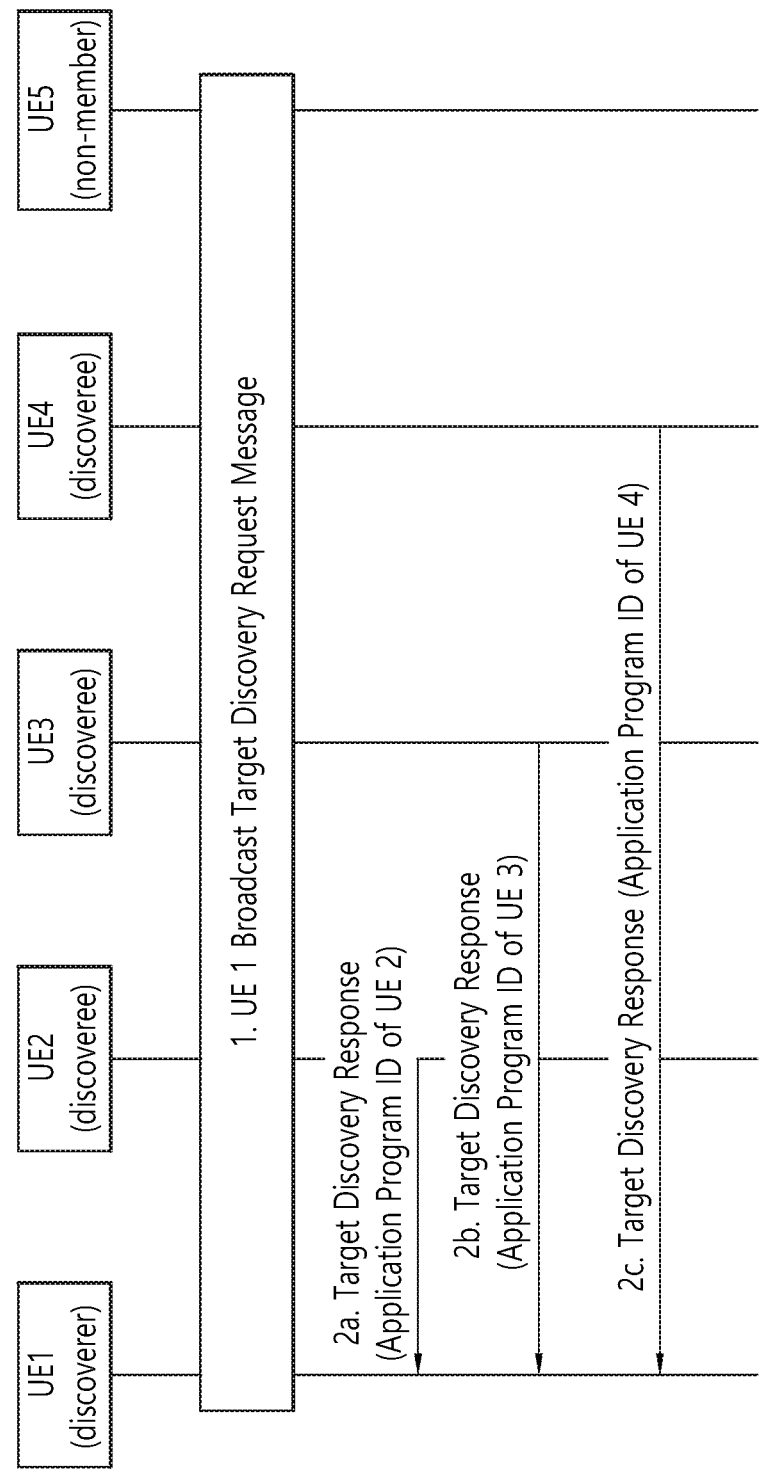
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

Hereinafter, the present invention will be described.

In the conventional wireless communication system (e.g., a wireless communication system operating based on the LTE-A Release 12), transmission of a sidelink discovery (hereinafter, simply referred to as "discovery") may occur only at a serving frequency. That is, transmitting a discovery signal at a frequency (non-serving frequency) other than the serving frequency is not considered. In case where the discovery signal is transmitted at the serving frequency, a reference cell regarding operations such as sidelink synchronization, sidelink power control, resource pool selection based on RSRP, and the like, required for transmission of the discovery signal is a serving cell of the serving frequency. That is, in transmitting the discovery signal, operations such as sidelink synchronization, sidelink power control, RSRP-based resource pool selection, and the like, are performed on the basis of the serving cell.

Figure 15:
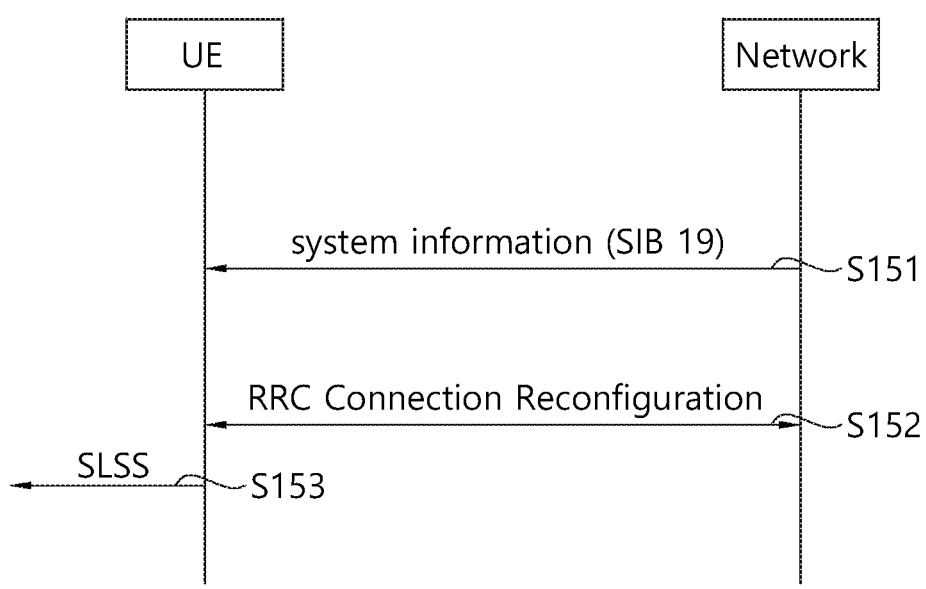
FIG. 15 illustrates a process of transmitting a sidelink synchronization signal for a sidelink discovery operation.

FIG. 15 illustrates a process of transmitting a sidelink synchronization signal for a sidelink discovery operation.

Referring to FIG. 15, a user equipment (UE) (i.e., terminal) receives system information (e.g., SIB 19) from a network (S151). The system information may include information required for transmitting sidelink synchronization signal.

After the UE and the network reconfigure RRC connection (S152), the UE may transmit a sidelink synchronization signal (SLSS) for another terminal (S153).

Meanwhile, in a future wireless communication system (e.g., a wireless communication system operating based on the LTE-A Release 13), transmission of a discovery signal may be performed at a frequency (i.e., non-serving frequency) other than the serving frequency. For example, when the serving frequency is f1 and a frequency other than f1 is f2, transmission of the discovery signal at f2 may be allowed. In this case, it is unclear how to determine discovery signal transmission or a reference cell of operations required for the discovery signal transmission. This is because, which cell of which frequency (serving frequency or non-serving frequency) is to be used as a reference cell of operations required for discovery signal transmission is not described in the existing communication standards.

In the case of performing discovery signal transmission at the non-serving frequency, the UE may operate as follows.

If the UE has an activated serving cell on a non-primary carrier, then the activated serving cell may be used always in downlink (DL) measurement and synchronization. Otherwise, one downlink carrier is used in DL measurement and synchronization for corresponding sidelink transmission, and here, the one downlink carrier may be a downlink carrier paired with a carrier on which the UE performs sidelink transmission or a downlink carrier not paired with the carrier on which the UE performs sidelink transmission. The one downlink carrier may be signaled to the UE by the network. Also, in selecting a reference cell at the non-serving frequency, the existing cell selection/re-selection process may be applied.

<Cell Selection and Re-Selection for Sidelink>

Figure 16:
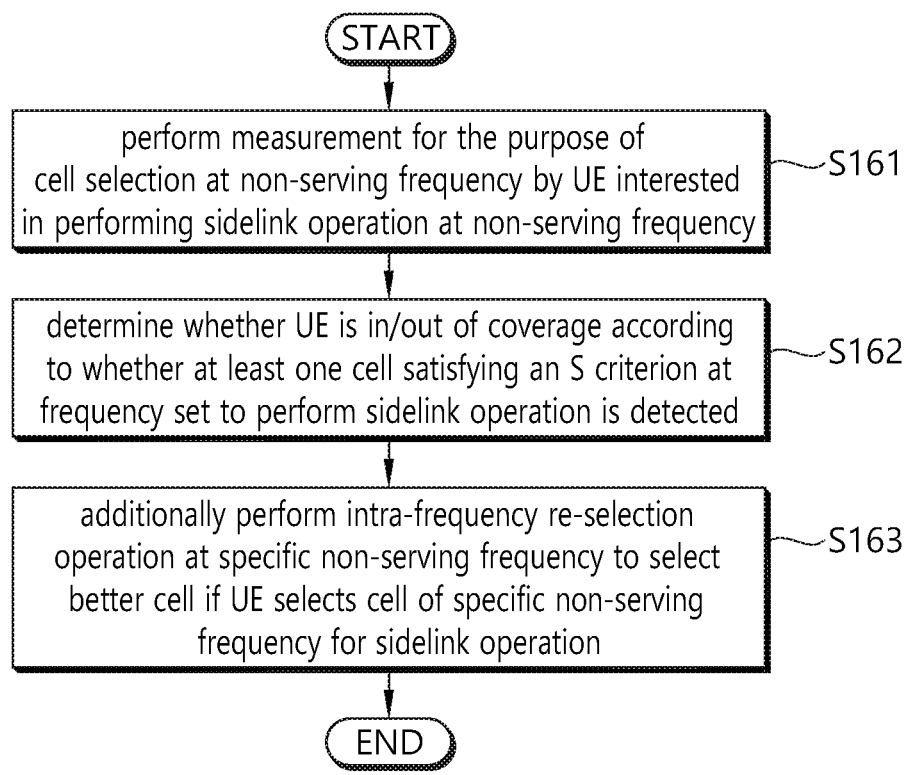
FIG. 16 illustrates a cell selection/re-selection method of a UE according to an embodiment of the present invention.

FIG. 16 illustrates a cell selection/re-selection method of a UE according to an embodiment of the present invention.

The method of FIG. 16 may be applied to a UE in an RRC idle state and an RRC connected state.

Referring to FIG. 16, the UE, which is interested in performing a sidelink operation at a non-serving frequency, performs measurement for the purpose of cell selection purpose at the non-serving frequency (S161). If the UE is interested in performing a sidelink operation, such as sidelink communication or a sidelink discovery operation, at a non-serving frequency, the UE must perform measurement for cell selection/re-selection at the non-serving frequency.

The UE determines whether the UE is in/out of coverage according to whether at least one cell satisfying an S criterion at a frequency set to perform a sidelink operation is detected (S162). S criterion has been described above with reference to Equation 1.

If at least one cell that satisfies an S criterion at a non-serving frequency set to perform a sidelink operation is detected, the UE may be regarded as being in coverage for the sidelink operation at the non-serving frequency. If none of cells satisfying the S criterion at the non-serving frequency is not detected, the UE may be regarded as being out of coverage for the sidelink operation at the non-serving frequency.

If the UE selects a cell of a specific non-serving frequency for the sidelink operation, the UE additionally performs an intra-frequency re-selection operation at the specific non-serving frequency to select a better cell (S163).

Figure 17:
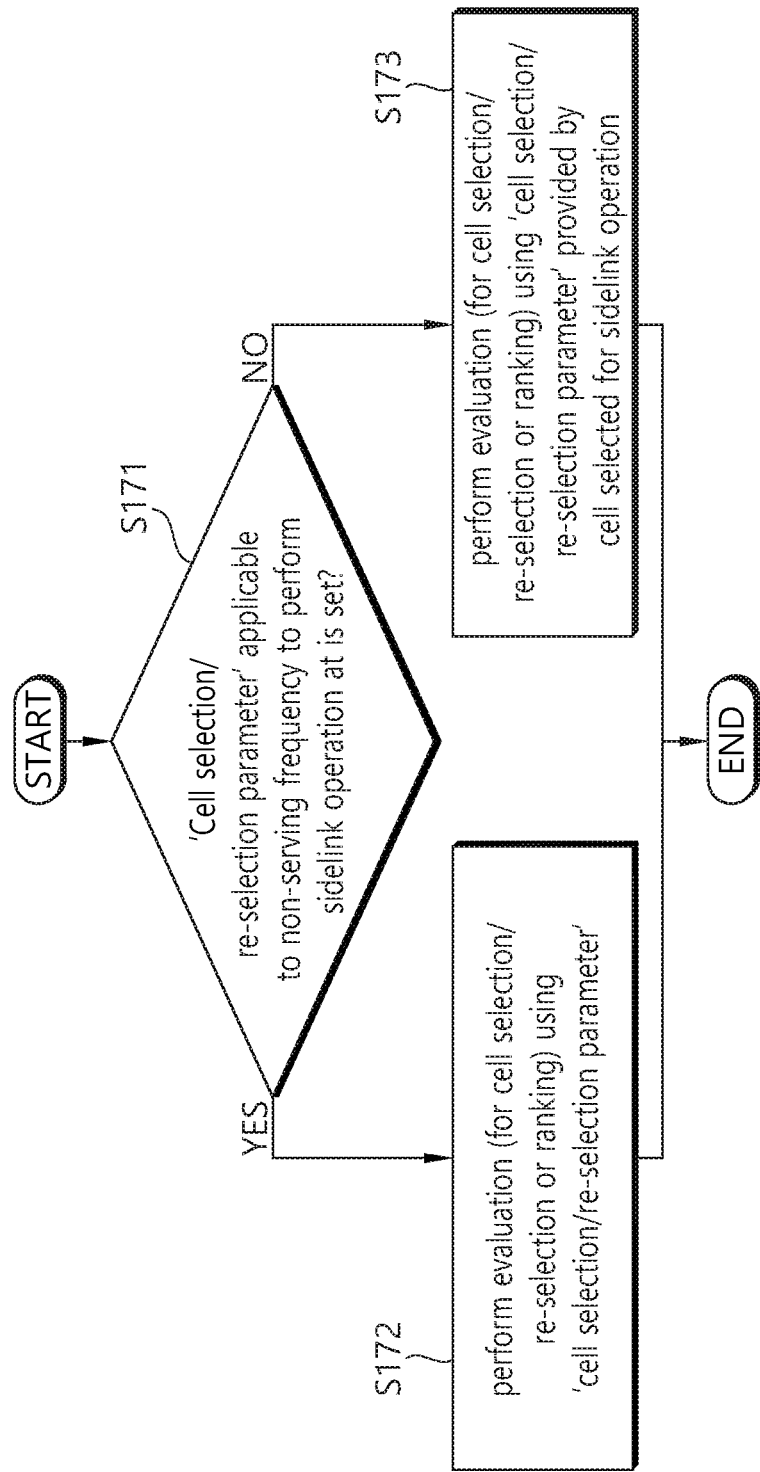
FIG. 17 illustrates a method for evaluating S criterion or R criterion (for ranking) regarding cell selection/re-selection for a sidelink operation at the non-serving frequency.

FIG. 17 illustrates a method for evaluating S criterion or R criterion (for ranking) regarding cell selection/re-selection for a sidelink operation at the non-serving frequency. S criterion may be used for cell selection and R criterion may be used for ranking in the cell reselection process. For the S criterion, [Equation 1] may be referred to, and for the R criterion, [Equation 2] may be referred to. Evaluation for ranking is mainly used in the cell selection/reselection (in particular, cell re-selection) process, but it may also be performed separately in a process other than the cell selection/re-selection.

Referring to FIG. 17, the UE determines whether a 'cell selection/re-selection parameter' applicable to a non-serving frequency to perform a sidelink operation at is set (S171).

If the 'cell selection/re-selection parameter' applicable to the non-serving frequency is set for the UE, the UE performs evaluation (for cell selection/re-selection or ranking) using the 'cell selection/re-selection parameter' (S172). For example, the cell selection/reselection parameter may include at least one parameter required for evaluating the S criterion or R criterion.

If the 'cell selection/re-selection parameter' applicable to the non-serving frequency is not set for the UE, the UE performs evaluation (for cell selection/re-selection or ranking) using the 'cell selection/re-selection parameter' provided by the cell selected for the sidelink operation (S173).

Hereinafter, each step of FIG. 17 will be described in detail.

When the UE desires to perform a sidelink discovery operation (specifically, a sidelink discovery announcement) at a non-serving frequency, the UE first determines whether information (hereinafter referred to as 'discCellSelectionInfo') regarding cell selection/re-selection applicable to the non-serving frequency is set for the UE. 'discCellSelectionInfo' may be included in system information (SIB 19) or a sidelink discovery-only setting signal for the UE and may be set by a serving cell.

Table 2 below illustrates SIB 19 including 'discCellSelectionInfo'.

TABLE 2

```
-- ASN1START
SystemInformationBlockType19-r12 ::= SEQUENCE {
    discConfig-r12                          SEQUENCE {
        discRxPool-r12            SL-DiscRxPoolList-r12,
        discTxPoolCommon-r12      SL-DiscTxPoolList-r12       OPTIONAL,   -- Need OR
        discTxPowerInfo-r12       SL-DiscTxPowerInfoList-r12  OPTIONAL, -- Cond Tx
        discSyncConfig-r12        SL-SyncConfigList-r12       OPTIONAL    -- Need OR
```

TABLE 2-continued

```
                                                         OPTIONAL,    -- Need OR
    discInterFreqList-r12      SL-CarrierFreqInfoList-r12    OPTIONAL,    -- Need OR
...
SL-DiscConfigOtherInterFreq-r13::=    SEQUENCE {
    txPowerInfo-r13            SL-DiscTxPowerInfoList-r12    OPTIONAL,    -- Cond Tx
    refCarrierCommon-r13       ENUMERATED {pCell}            OPTIONAL,    -- Need OR
    discSyncConfig-r13         SL-SyncConfigListNFreq-r13    OPTIONAL,    -- Need OR
    discCellSelectionInfo-r13       CellSelectionInfoNFreq-r13  OPTIONAL   -- Need OR
}
```

In the above table, 'discRxPool' indicates a resource allowing the UE to receive a non-public safety (PS) sidelink discovery announcement. 'discInterFreqList' indicates frequencies supporting the sidelink discovery announcement, and additional information such as received resources/transmission resources or resource acquisition methods may be provided. 'discCellSelectionInfo' is a parameter used by the UE to perform cell selection/reselection at the corresponding non-serving frequency, and if this field is not present, the UE acquires it from a cell of the corresponding frequency.

Equation 3 below shows another example of evaluating R criterion.

$$R_s = Q_{meas,s} + Q_{hyst} - Q\text{offset}_{temp},\ R_n = Q_{meas,n} - Q_{offset} - Q\text{offset}_{temp}$$ [Equation 3]

In Equation 3, $R_s$ denotes a ranking indicator of the serving cell in which the UE is camped on, $R_n$ denotes a ranking indicator of a neighboring cell, $Q_{meas,s}$ denotes a quality value measured by the UE with respect to the serving cell, $Q_{meas,n}$ denotes a quality value measured by the UE with respect to a neighboring cell, $Q_{hyst}$ a hysteresis value for ranking, and $Q_{offset}$ an offset between two cells. $Q\text{offset}_{temp}$ needs not be used when ranking for the purpose of selecting a reference cell (this value may only be used for a reception failure (Chiba issue) of a random access response).

'discCellSelectionInfo' may include ranking parameters for the purpose of selecting or reselecting the reference cell, for example, parameters such as $Q_{hyst}$ and $Q_{offset}$, and may be provided by the serving cell. In this case, the UE does not need to acquire the ranking parameters from an SIB broadcast by the cell at the corresponding frequency. In the ranking measurement for the purpose of selection/re-selection of the reference cell, $Q_{offset}$ may always be a zero value. The $Q_{hyst}$ value may be provided as a value that may be commonly used in rank measurement for the purpose of selection/re-selection of the reference cell and rank measurement for other purposes.

When the UE sets the carrier (corresponding carrier) on which the UE desires to perform a discovery operation to a reference carrier, the network may provide measurement parameters regarding the corresponding carrier. The parameters may be, for example, $Q_{hyst}$ and $Q_{offset}$ used in ranking measurement. The network may provide a default $Q_{hyst}$ with a cell list. In this case, if the UE selects a cell included in the cell list as a reference cell, the UE may use the default $Q_{hyst}$.

If information ('discCellSelectionInfo') about cell selection/re-selection applicable to the non-serving frequency is set, the UE performs an evaluation for cell selection/re-selection or ranking at the non-serving frequency using the cell selection/re-selection parameters included in the 'discCellSelectionInfo'.

That is, if the 'discCellSelectionInfo' is set for the UE by the serving cell, the UE performs evaluation for the S criterion or the R criterion (for ranking) regarding cell selection/re-selection for sidelink communication or sidelink discovery at non-serving frequency using the cell selection/re-selection parameters included in the 'discCellSelectionInfo'. If there is a parameter (i.e., an optional parameter) which is used in the evaluation but is not included in the 'discCellSelectionInfo', a predetermined value, for example, '0' (zero), may be applied to the non-included parameter.

If the 'discCellSelectionInfo' is not set for the UE from the serving cell, the UE may perform the evaluation using parameters for cell selection/re-selection broadcast by a cell (which may be a predetermined cell or which may be selected on the basis of a certain reference at the non-serving frequency) selected for the sidelink operation. In the cell reselection process, if there are common parameters applicable to the corresponding frequency. the UE may use the common parameters. Otherwise, the UE may use parameters obtained from SIB 1/SIB 3 of the cell selected for sidelink operation.

The UE may regard a carrier previously set for sidelink communication as having highest cell re-selection priority. If a frequency set to perform sidelink communication is a serving frequency, the terminal may use a serving cell of the serving frequency, for a sidelink operation.

<Case where UE Sets Frequency Other than Frequency at which UE is to Perform Discovery Operation to a Reference Frequency for Discovery Operation>

When the UE desires to set a frequency other than the frequency at which the UE is to perform the discovery operation to a reference frequency for the discovery operation, the network may set any one of the serving frequencies to a reference frequency. For example, the network may set one of the primary carrier frequencies or the secondary serving frequencies to the reference frequency. In this case, the RRM measurement performed by the UE for a Uu interface may be reused for the sidelink operation.

In the RRC idle mode, the network may set the carrier or the primary carrier on which the UE desires to perform the discovery operation to a reference carrier. In the RRC connected mode, the network may set any one of the carrier on which the UE desires to perform the discovery operation, the primary carrier, and the secondary carrier, to a reference carrier.

In setting the reference carrier, whether the network will indicate 1) only a specific carrier frequency or 2) the specific carrier frequency and even a specific cell at the specific carrier frequency may matter. Since the above-mentioned two methods do not appear to be technically different, a method with low signaling overhead may be desirable. Using the method of indicating even a specific cell, among the two methods described above, may be undesirable considering that an index of the secondary cell is changed when an intra-base station and an intra-frequency secondary cell are replaced.

Therefore, when a frequency other than the frequency at which the discovery operation is to be performed is desired to be set to a reference frequency, the network may provide only frequency information (i.e., excluding the cell index/ID).

The UE may use a serving cell of the indicated carrier frequency as a reference cell.

If the reference cell is deactivated, the UE itself may select a new cell as a reference cell according to a predetermined rule. The network may set a fallback frequency/cell for the UE in advance, and if the reference cell is deactivated, the network causes the UE to reselect the cell of the fallback frequency as a reference cell.

<Case where UE Sets Frequency at which Discovery Operation is to be Performed to Reference Frequency for Discovery Operation>

The network may set a frequency at which the UE desires to perform a discovery operation to a reference frequency for the discovery operation. The frequency to perform the discovery operation at may be a serving frequency or a non-serving frequency. Hereinafter, it is assumed that the frequency to perform the discovery operation at is a non-serving frequency.

When determining a frequency at which the UE desires to perform a discovery operation to a reference frequency for the discovery operation, the network must determine which cell is to be used as a reference cell and how the UE should select the reference cell.

For compatibility with existing wireless communication systems, it is desirable to make the best use of the existing mechanisms.

If the UE is interested in performing sidelink communication at a non-serving frequency, the UE may perform measurement at the non-serving frequency for cell selection and intra-frequency cell re-selection. The UE may be a UE capable of performing a function for public safety (PS).

In the inter-frequency sidelink discovery operation (especially, for commercial purpose), what requirements are to be applied may matter.

A ranking operation may be applied even to an inter-frequency sidelink discovery operation. That is, the UE may determine the ranking of cells and select a cell of the best rank at the frequency at which the sidelink discovery operation is performed. This is to minimize occurrence of interference. However, it is not desirable to apply measurement requirements applied to the inter-frequency sidelink communication to the inter-frequency sidelink discovery equally, and it is desirable to apply more relaxed measurement requirements to the inter-frequency sidelink discovery.

In case where a carrier on which the UE desires to perform a discovery operation is set to a reference carrier, a cell of the best rank may be used as a reference cell in the carrier. In order to detect the cell of the best rank, the UE may perform inter-frequency measurements on the carrier according to inter-frequency measurement requirements.

It is assumed that a carrier on which the UE desires to perform a discovery operation is a corresponding carrier. In order to perform measurement at the corresponding carrier frequency, the UE must know a measurement bandwidth. In the case of an intra-PLMN/inter-frequency, information about the corresponding carrier frequency used in the discovery operation may be included in SIB 5. Therefore, the UE may know the measurement bandwidth.

However, in the case of inter-PLMN/inter-frequency, since the corresponding frequency belongs to another PLMN, frequency information (including the bandwidth) regarding the corresponding frequency may not be included in the SIB 5 of the serving cell.

The serving cell needs to inform the UE about the corresponding frequency through SIB 19 signaling. Then, the UE may request a transmission resource from a cell of the corresponding frequency.

When the UE sets a carrier (referred to as a "corresponding carrier") on which the UE desires to perform a discovery operation to a reference carrier, the network provides measurement information (e.g., a measurement bandwidth) for the corresponding carrier. The corresponding carrier may be a non-serving frequency.

If measurement on the corresponding carrier cannot be performed without a measurement gap, the UE may trigger/transmit a message requesting the measurement gap to the network. The message may be, for example, sidelink UE information (SidelinkUEInformation). The network may send a measurement gap establishment message in response to the message.

If the UE is interested in performing a sidelink discovery operation at a non-serving frequency, the UE may perform measurement at a related downlink frequency and perform the existing cell selection/intra-frequency re-selection to search for the best rank cell at the frequency.

The selected cell may be used for the sidelink discovery operation. That is, the UE may apply D2D setting for the selected cell, and the D2D setting may be informed by the serving cell through a dedicated signal for the UE, or may be informed by the cell selected for the sidelink discovery through the SIB 19.

The serving cell may provide parameters related to cell selection/re-selection in SIB 19. For the cell selection, 'disccellSelectionInfo' including q_RxLevMin, q_RxLevMinOffset, etc., defined in SIB 1 may be provided. For cell re-selection, q_Hyst, q_RxLevMin, t_Re-selection_EUTRA, etc., described in SIB3 may be provided.

For the purpose of cell selection/re-selection at a frequency other than the serving frequency, the following parameters may be provided by the SIB19 of the serving cell. For cell selection, 'cellSelectionInfo' including q_RxLevMin, q_RxLevMinOffset, and the like, defined in SIB 1 may be provided. For cell re-selection, q_Hyst, q_RxLevMin, t_Re-selection_EUTRA, and the like, described in SIB 3 may be provided.

If the serving cell and a neighboring cell are not in a coordinated state at the non-serving frequency, the serving cell may not provide a common parameter to the UE.

For a UE which is interested in performing a discovery operation at the non-serving frequency, whether it is required to acquire SIB 1 and SIB 3 from the cell selected for discovery may be controlled.

If the parameters (parameters for synchronization, ranking measurement, channel state measurement, etc. required for the sidelink discovery operation) applicable to the corresponding frequency at which the UE desires to perform a sidelink discovery operation are configured (or set) for the UE by the serving cell, the UE may perform cell selection/reselection at the corresponding frequency using the parameters. That is, the UE may use the parameters to select the best rank cell at the corresponding frequency. The parameters may be acquired through system information such as SIB 19 or may be acquired through a signal dedicated to the UE. In this case, the UE does not need to acquire the parameters for cell selection/re-selection from the cell (specifically, SIB 1-3 of the cell) of the corresponding frequency.

If the parameters applicable to the corresponding frequency to perform the sidelink discovery operation at are not configured for the UE from the serving cell, the UE may need to acquire the parameters necessary for cell selection/re-selection at the corresponding frequency from the cell of the corresponding frequency.

The UE may need to acquire the parameters at every modification period from the selected cell at the corresponding frequency. The UE may determine validity of the parameters at the boundary of each modification period. For example, the validity may be checked by checking a value tag in SIB 1 of the selected cell. When it is determined that the value of the value tag of SIB1 has changed from the previously stored value, the UE may not use the existing parameters. The UE may stop the discovery operation at the corresponding frequency until it acquires new parameters from the SIB.

In the above, the sidelink discovery operation has mainly been described as an example, but the present invention may also be applied to sidelink communication similarly. That is, depending on whether the serving cell provides parameters for the corresponding frequency at which sidelink communication is to be performed via SIB 18 or the dedicated signal for the UE, it is possible to 1) perform measurement/ranking required for sidelink communication using the parameters provided from the serving cell or 2) acquire the parameters from the cell of the corresponding frequency and perform measurement/ranking required for sidelink communication.

Figure 18:
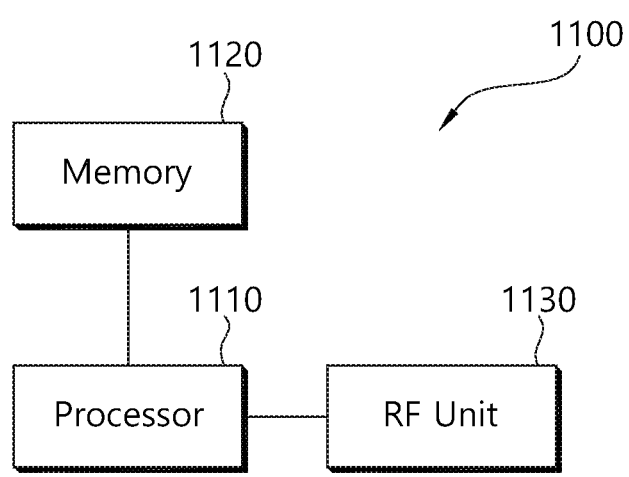
FIG. 18 is a block diagram showing a UE according to an embodiment of the present invention.

FIG. 18 is a block diagram showing a UE according to an embodiment of the present invention.

Referring to FIG. 18, a UE 1100 includes a processor 1110, a memory 1120, and radio frequency (RF) unit 1130. The processor 1110 implements the proposed functions, procedures, and/or methods.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A cell selection method for an inter-frequency sidelink operation performed by a user equipment (UE) in a wireless communication system, the cell selection method comprising:
   receiving, by the UE from a serving cell, system information that includes a cell selection parameter; and
   performing evaluation for cell selection of a cell of a non-serving frequency using the cell selection parameter received from the serving cell,
   wherein the UE selects the cell of the non-serving frequency for sidelink discovery announcement based on the evaluation,
   wherein the cell selection parameter includes a required minimum received power level in the cell of the non-serving frequency, and
   wherein when a specific parameter is not included in the cell selection parameter, which is used for the performing the evaluation for the cell selection of the cell of the non-serving frequency, the UE applies a zero value to the specific parameter.

2. The cell selection method of claim 1, wherein the system information is a system information block (SIB) 19.

3. The cell selection method of claim 1, wherein when the UE selects the cell of the non-serving frequency, the UE transmits the sidelink discovery announcement message on the cell.

4. The cell selection method of claim 1, wherein the cell selection parameter is provided through a radio resource control (RRC) message.

5. The cell selection method of claim 1, wherein when the UE selects the cell of the non-serving frequency, the UE re-selects a best-ranked cell of the non-serving frequency using the cell selection parameter received from the serving cell.

6. The cell selection method of claim 1, wherein the required minimum received power level is a minimum reference signal received power (RSRP) level for camping on the cell of the non-serving frequency.

7. A user equipment (UE) comprising:
   a radio frequency (RF) unit transmitting and receiving a wireless signal; and
   a processor coupled to the RF unit,
   wherein the processor is configured to:
   receive, via the RF unit from a serving cell, system information that includes a cell selection parameter, and
   perform evaluation for cell selection of a cell of a non-serving frequency using the cell selection parameter received from the serving cell,
   wherein the UE selects the cell of the non-serving frequency for sidelink discovery announcement based on the evaluation,
   wherein the cell selection parameter includes a required minimum received power level in the cell of the non-serving frequency, and
   wherein when a specific parameter is not included in the cell selection parameter, which is used for the perform the evaluation for the cell selection of the cell of the non-serving frequency, the UE applies a zero value to the specific parameter.

8. The UE of claim 7, wherein the system information is a system information block (SIB) 19.

9. The UE of claim 7, wherein when the UE selects the cell of the non-serving frequency, the UE transmits the sidelink discovery announcement message on the cell.

10. The UE of claim 7, wherein the cell selection parameter is provided through a radio resource control (RRC) message.

11. The cell selection method of claim 1, wherein the UE performs the evaluation without receiving another system information on the cell.

* * * * *